(12) United States Patent
Weiglein et al.

(10) Patent No.: US 10,520,033 B2
(45) Date of Patent: Dec. 31, 2019

(54) CAGE FOR CRANKSHAFT BEARING ASSEMBLY

(71) Applicant: Aktiebolaget SKF, Gothenburg (SE)

(72) Inventors: Juergen Weiglein, Oerlenbach (DE); Franziska Meyer, Schweinfurt (DE)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 15/635,792

(22) Filed: Jun. 28, 2017

(65) Prior Publication Data

US 2018/0003231 A1   Jan. 4, 2018

(30) Foreign Application Priority Data

Jun. 30, 2016  (DE) .................. 10 2016 211 906

(51) Int. Cl.
| | |
|---|---|
| *F16C 33/66* | (2006.01) |
| *F16C 33/51* | (2006.01) |
| *F16C 19/26* | (2006.01) |
| *F16C 9/04* | (2006.01) |
| *F16C 9/00* | (2006.01) |
| *F16C 33/58* | (2006.01) |

(52) U.S. Cl.
CPC .......... *F16C 33/6681* (2013.01); *F16C 9/04* (2013.01); *F16C 33/516* (2013.01); *F16C 9/00* (2013.01); *F16C 19/26* (2013.01); *F16C 33/585* (2013.01); *F16C 2360/22* (2013.01)

(58) Field of Classification Search
CPC .......... F16C 9/02; F16C 9/04; F16C 33/4641; F16C 33/51; F16C 33/513; F16C 33/516; F16C 33/6614; F16C 33/6629; F16C 33/6651; F16C 33/6681
See application file for complete search history.

(56) References Cited

U.S. PATENT DOCUMENTS

| 939,056 | A | | 11/1909 | Michaud |
|---|---|---|---|---|
| 1,915,287 | A | * | 6/1933 | Bott ...................... F16C 33/385 |
| | | | | 384/528 |
| 1,966,775 | A | | 7/1934 | Weis |
| 2,417,559 | A | | 3/1947 | Larson |
| 4,192,560 | A | * | 3/1980 | Hartnett .................. F16C 19/30 |
| | | | | 384/572 |
| 4,708,498 | A | | 11/1987 | Labedan |
| 6,981,801 | B2 | | 1/2006 | Yokota |
| 8,888,373 | B2 | | 11/2014 | Mangold |
| 8,894,293 | B2 | | 11/2014 | Beck |
| 9,249,832 | B2 | | 2/2016 | Friedrich |

(Continued)

FOREIGN PATENT DOCUMENTS

| DE | 2041342 A1 | 2/1972 |
|---|---|---|
| DE | 102007044901 A1 | 4/2009 |
| DE | 102010055090 A1 | 8/2011 |

(Continued)

*Primary Examiner* — James Pilkington
(74) *Attorney, Agent, or Firm* — Garcia-Zamor Intellectual Property Law, LLC; Ruy Garcia-Zamor; Bryan Peckjian (57) ABSTRACT

A rolling-element bearing assembly includes an inner race and an outer race and a plurality of rolling elements between inner and outer races, the rolling elements being mounted in pockets between axial bridges of a cage having first and second axial side rings. One or both of the side rings has at least one corrugated surface, and the corrugations project axially and/or radially.

17 Claims, 4 Drawing Sheets

(56) References Cited

U.S. PATENT DOCUMENTS

2004/0156571 A1    8/2004   Kotani
2014/0301683 A1   10/2014   Higdon

FOREIGN PATENT DOCUMENTS

| DE | 102010037331 A1 | | 3/2012 |
|----|----|----|----|
| DE | 102012203851 A1 | | 9/2013 |
| DE | 102012019090 A1 | | 3/2014 |
| EP | 1219843 A2 | | 7/2002 |
| EP | 2884128 | * | 6/2015 |
| GB | 1352909 A | | 5/1974 |
| JP | 2001-304270 | * | 10/2001 |
| JP | 2007247814 A | | 9/2007 |
| JP | 2008-286232 | * | 11/2008 |
| JP | 2014211240 A | | 11/2014 |
| JP | 2016109142 A | | 6/2016 |

\* cited by examiner

CAGE FOR CRANKSHAFT BEARING ASSEMBLY

CROSS-REFERENCE

This application claims priority to German patent application no. 102016211906.0, filed on Jun. 30, 2016, the contents of which are fully incorporated herein by reference.

TECHNICAL FIELD

The present invention relates to a rolling-element bearing assembly, in particular for a crankshaft bearing assembly, in particular for a connecting-rod- and/or main-shaft-bearing assembly of the crankshaft.

BACKGROUND OF THE PRESENT INVENTION

Sliding bearings and/or rolling-element bearings are usually used in crankshaft bearing assemblies. The pin of the crankshaft is bounded here by two crankshaft cheeks such that the bearing assembly is not only bordered over its radial inner and radially outer race surface, but also axially by the crankshaft cheeks. With use of a roller bearing this limited installation space can lead, among other things, to problems with lubricant supply. Thus, for example, the installation space allows only limited possibilities to deliver the oil supplied for the required lubricating film in the rolling-element bearing from inside via the housing raceway outward into a motor housing receiving the crankshaft. In order to counteract this problem it has been proposed, for example, in DE 10 2010 055 090 A1, to provide lubricant channels that allow lubricant to pass through the rolling-element bearing.

However, it is disadvantageous with this prior art that while lubricant can be guided to the bearing, a lubricant exchange is only possible to a limited extent since at least some lubricant remains static in the bearing.

BRIEF SUMMARY OF THE PRESENT INVENTION

An aspect of the present disclosure is therefore to provide a rolling-element bearing assembly that ensures the passage of lubricant even with limited installation spaces, which occur, for example, in a crankshaft bearing assembly.

In the following a rolling-element assembly having a radially inner race surface and a radially outer race surface is disclosed, wherein the race surfaces are disposed spaced with respect to each other and include rolling elements between them that roll on the race surfaces. These rolling elements are in turn received in a cage, which includes at least two side rings that are spaced from each other via bridges. Here the bridges form pockets between themselves that receive the rolling elements spaced from one another and guide them. Furthermore, the radially inner surface is disposed on a first component and the radially outer surface on a second component. Here the race surfaces can be formed integral with the first or second component; however it is also possible to form the race surfaces on separate bearing rings that are received by the respective component. In this formation, the bearing rings can include an outer bearing ring and an inner bearing ring. The cage can be located in a groove in a surface of one of the outer bearing ring and the inner bearing ring. A mixed form is also possible wherein one component includes the race surface directly and the other component includes a bearing ring. In addition, the rolling-element bearing assembly is bordered axially by side walls of at least one of the components, which side walls extend radially beyond the race surfaces. A very limited installation space for the rolling-element bearing thereby arises, as is common, for example, with crankshaft bearing assemblies, in particular with a connecting-rod- and/or main-shaft-bearing assembly of the crankshaft. However, other application cases are of course also comprised by the disclosure.

As one exemplary embodiment shows, the rolling-element bearing assembly is configured as a connecting-rod bearing assembly, wherein the first component is a crankpin of a crankshaft disposed between two crankshaft cheeks, and the second component is a connecting rod eye of a connecting rod, or a housing connection in the engine block. Furthermore the crankshaft cheeks of the crankshaft extend axially on both sides of the connecting rod radially outward beyond the outer race surface provided by the connecting rod eye or the housing.

In order to improve the supply of lubricant in such a rolling-element bearing it is proposed to form at least one of the side rings of the cage at least partially corrugated or undulated. During operation of the rolling-element bearing assembly this corrugation or undulation ensures that lubricant is moved over the sequence of corrugation peaks and corrugation valleys in the rolling-element bearing, with the result that no static lubricant accumulation can occur in the rolling-element bearing. Due to the continually tapering spaces between the corrugations in operation, a hydrodynamic effect arises that leads to an uplift or even separation of the surfaces of the cage and the race surface on the outer raceway and a reduction of the friction and a movement of the lubricant in the rolling-element bearing. In turn the passage of the lubricant through the rolling-element bearing can be improved, and a lubricant accumulation in the bearing can be avoided. In addition a further friction reduction is possible due to pressure reduction.

It is to be noted here in particular that the corrugations of the side surface are not separate lubricant grooves. Although the extension of lubricant grooves is sufficient for lubricant transport, their shape cannot however ensure the hydrodynamic effect provided by the corrugations. For this purpose a uniform corrugation is necessary whose shape can be described, for example, by a sine function. The difference between corrugation and groove consists in particular in the abrupt transition, typical for a groove, from an essentially smooth surface to a depression. However, this abrupt transition does not lead to a periodic tapering of the spaces, which is necessary for the desired hydrodynamic effect.

According to a further advantageous exemplary embodiment the corrugation of the side ring is configured such that corrugation peaks rising from corrugation valleys rise essentially radially outward. A corrugation shape thereby arises on the outer diameter that serves in particular for lubricant guiding and makes possible a lubricant film on the contact surface between cage and component or cage and rolling elements.

Here it is preferred in particular when the corrugation peaks are disposed in the region of the pockets, and the corrugation valleys are disposed in the region of the bridges of the cage. The lubricant can thereby be guided into the region out from which it can be delivered to the rolling elements. Here it has been shown in particular that the supplying of lubricant to the rolling elements functions particularly well when the radially outermost point of the corrugation peaks is disposed essentially in the region of the rolling-element center. Alternatively, however, the corrugation peak can also be disposed in the region of the bridges and the corrugation valleys can also be disposed in the region of the pockets.

Alternatively or in addition to an axial corrugation a lateral corrugation shape can also be realized, wherein a corrugation of the side ring is configured such that corrugation peaks rising from corrugation valleys rise essentially axially outward. This lateral corrugation shape also favors the active lubricant distribution in the rolling-element bearing, with the result that the formation of static lubricant accumulations is also prevented. Here in particular an embodiment has also proven advantageous wherein two smooth annular, mutually concentrically configured regions are formed on the side ring, which regions function as slip surfaces of the bearing cage on the side walls of the surrounding component. The corrugation on the side surface here is preferably disposed concentric between the two slip surfaces. As a result, on the one hand, support at axially outer sides can be ensured, while on the other hand lubricant accumulations are prevented from forming in axially outer regions that could prevent lubricant from passing through the bearing.

According to a further advantageous exemplary embodiment the cage is configured split and includes at least one first and one second cage segment that abut on each other at separating surfaces. Via this split design the bearing cage can be simply disposed on the first component.

Here it is preferred in particular when the separating surfaces are configured complementary to each other, wherein one separating surface is configured concave and the complementary separating surface convex. Assembly inaccuracies can thereby be avoided and the two surfaces can be centered with respect to each other, so that the cage segments are configured optimally with respect to each other.

Furthermore it is advantageous when the cage segments are unequally split. This means that one cage segment is configured larger than the other cage segment. Thus, for example, a 9/11 division is possible wherein 11 bridges of one segment face 9 bridges of the other segment. The unequal division also serves for a more precise pairing and an assembly securing.

According to a further advantageous exemplary embodiment the rolling-element cage is manufactured from an injection-moldable plastic. Here the injection-moldable plastic can preferably include a fiber-reinforcement. Lightweight and easy-to-manufacture cages can be provided for mass production by injection molding. In addition, the above-described corrugation shape of the bearing cage supports the flow properties during injection molding, with the result that the repeatability and controlling of tolerances in the manufacturing process is increased. Moreover, the manufacturing via an injection-molding method makes possible a greater design freedom of the entire rolling-element bearing cage, with the result that the rolling properties and lubricant-guiding properties of the cage can be optimized.

According to a further advantageous exemplary embodiment, injection points for the injection-molding manufacturing of the cage are disposed in a region of the cage that is subject to low mechanical loads. Here the position of the injection points is preferably chosen such that first the bridge and then the side rings are formed by the injection-molding method. Furthermore it is advantageous when the injection points are chosen such that in the highly loaded center of the cage segment a connecting seam is formed with a fiber entanglement.

According to a further advantageous exemplary embodiment at least one lubricant groove is formed axially outside on at least one of the side rings, which lubricant groove extends radially and/or tangentially-radially (an incline relative to a radial direction). Using this lubricant groove lubricant can be transported from a bearing interior to the bearing exterior and/or a bearing outer side in the bearing interior. However, in order to prevent a lubricant accumulation in the rolling-element bearing, as mentioned above, the corrugations are formed on the bearing cage, which corrugations ensure a movement of the lubricant introduced into the bearing assembly.

According to one further advantageous exemplary embodiment, at least one bridge of the cage has a tapering in the axial direction that is preferably disposed approximately in the center of the bridge. The rolling element received in the associated cage pocket is thereby substantially contacted by the bridge at its rolling-element ends, with the result that a skewing of the rolling element is prevented, but a sufficiently stable contact of the rolling element in the pocket remains ensured. The optionally formed radially directed long, parallel contact surfaces on the bridge also serve for an improved guiding of the rolling element in the pocket, wherein the bridge surfaces outside the contact surfaces are preferably formed so as to osculate about the rolling element. It is thereby ensured that the rolling element can vary radially in the pocket but does not reach a clamping state. The osculating design also improves the lubricant flow between rolling element and cage. Here furthermore the osculating bridge surfaces can optionally be formed outside the contact surfaces as so-called retaining lobes, which facilitate the installation of the rolling element into the pocket by a deflecting.

For an optimized axial contact surface of the rolling element in the pocket it can furthermore be provided that the pocket has a recess at at least one inner side wall of one of the side rings at the level of the rolling-element center. A contact of the pocket with the rolling element at the centerpoint of the rolling element can thereby be avoided. The contact is thus carried in a defined manner in an outer region of the rolling element, whereby manufacturing tolerances and straightness tolerances are increased in the forming of the bearing cage without restricting the mobility of the rolling element in the pocket. Here it is furthermore advantageous when an edge transition to the side ring is formed free of burrs and/or rounded in order to apply the lubricating film onto the rolling-element surface and not shear it off. It is also advantageous to provide a larger radius in the pocket corners by these being designed occurring slightly recessed.

A further aspect of the present disclosure relates to a bearing cage for a rolling-element bearing in limited spaces, as described above.

Further advantages and advantageous embodiments are specified in the description, the drawings, and the claims. Here in particular the combinations of features specified in the description and in the drawings are purely exemplary, so that the features can also be present individually or combined in other ways.

In the following the disclosure is described in more detail with reference to the exemplary embodiments depicted in the drawings. Here the exemplary embodiments and the combinations shown in the exemplary embodiments are purely exemplary and are not intended to define the scope of the disclosure. This scope is defined solely by the pending claims.

DETAILED DESCRIPTION

In the following, identical or functionally equivalent elements are designated by the same reference numbers.

Figure 1:
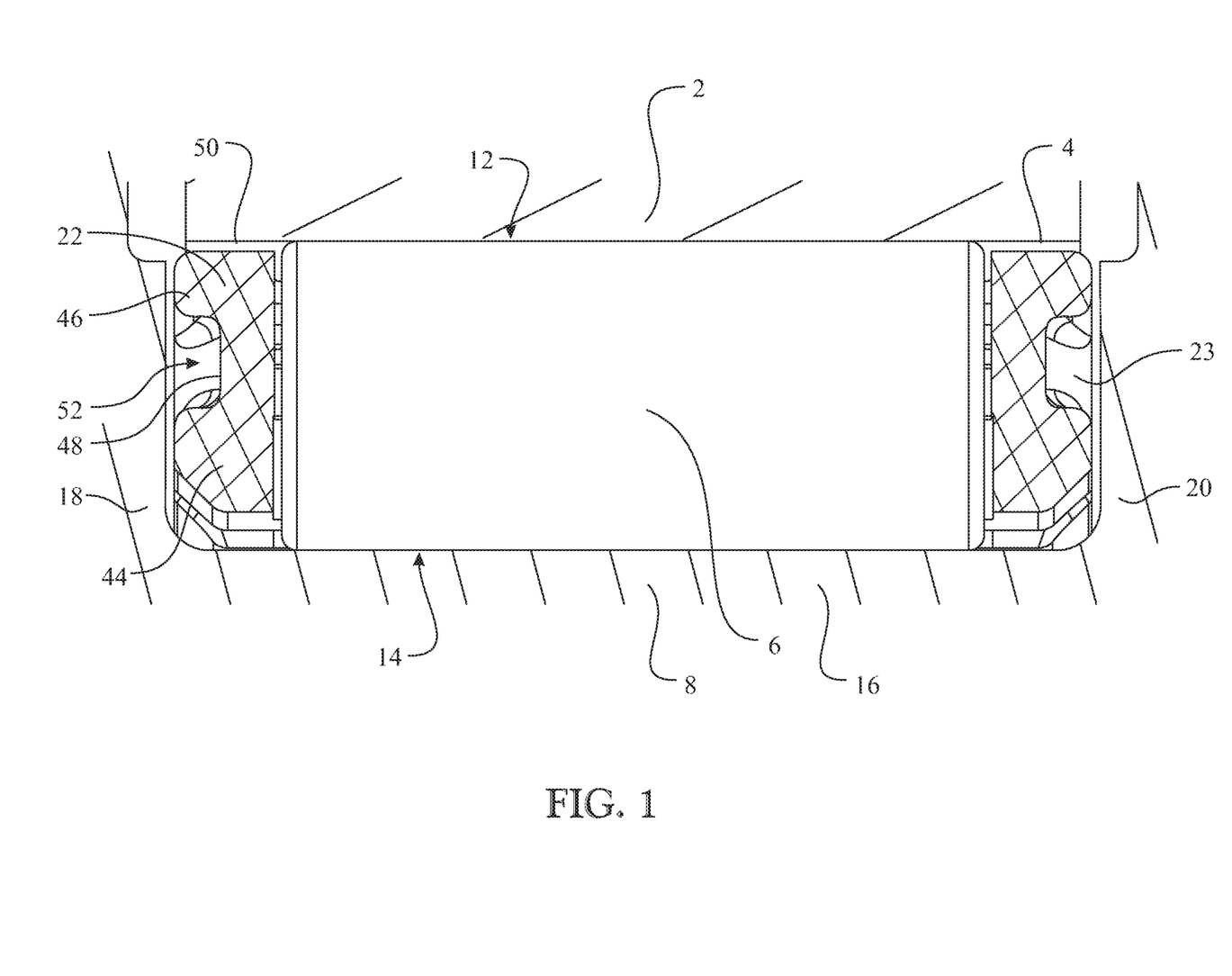
FIG. 1 presents a schematic sectional view through a rolling-element bearing assembly.

FIG. 1 shows a perspective sectional view through a rolling-element bearing assembly 1, which in the depicted case is configured as a crankshaft bearing assembly. As can be seen in FIG. 1 a rolling-element bearing 6 is disposed in a connecting rod eye 4 of a connecting rod 2 or in a housing 4 for a crankshaft. The rolling-element bearing 6 ensures a rolling of the connecting rod 2 or of the housing 4 along a crankshaft 8. Here, as can be seen in FIG. 1, in the rolling-element bearing assembly 6 an outer raceway 12, on which a rolling element 10 rolls, is formed over the connecting rod eye or housing 4, while an inner raceway 14 is depicted over a crankpin 16 of the crankshaft 8. The crankpin 16 is in turn disposed between two crankshaft cheeks 18, 20, which extend axially beyond the outer race surface 12 of the connecting rod eye 4.

The rolling-element bearing assembly 1 is bordered axially by side walls 3, 9 of at least one of the components (connecting rod/housing 2, crankshaft 8), which side walls (connecting rod/housing side wall 3, crankshaft side wall 9) extend radially beyond surfaces of the race. A very limited installation space for the rolling-element bearing thereby arises, as is common, for example, with crankshaft bearing assemblies, in particular with a connecting-rod- and/or main-shaft-bearing assembly of the crankshaft. The pocket 30 has a span S6. The crankshaft (first component) 8 has a span S8 between crankshaft side walls 9. The connecting rod/housing (second component) 2 has a span S2 between connecting rod/housing side walls 3. Each of the spans, the connecting rod/housing side wall span S2 and the crankshaft side wall span S8 are larger than the race surface side wall span S6, as illustrated in FIG. 1.

The installation space provided for the rolling-element bearing 6 is highly confined by the crankshaft cheeks 18, 20. In addition, the rolling elements 10 are received in a bearing cage 22, which further limits the installation space. The limited installation space and the bearing cage 22 thus prevent a lubricant ingress and a passing of lubricant into/through the rolling-element bearing 6, with the result that additional measures must be taken in order to on the one hand, guide the lubricant into the rolling-element bearing 6 and on the other hand to ensure that the lubricant in the rolling-element bearing 6 does not remain static.

Figure 2:
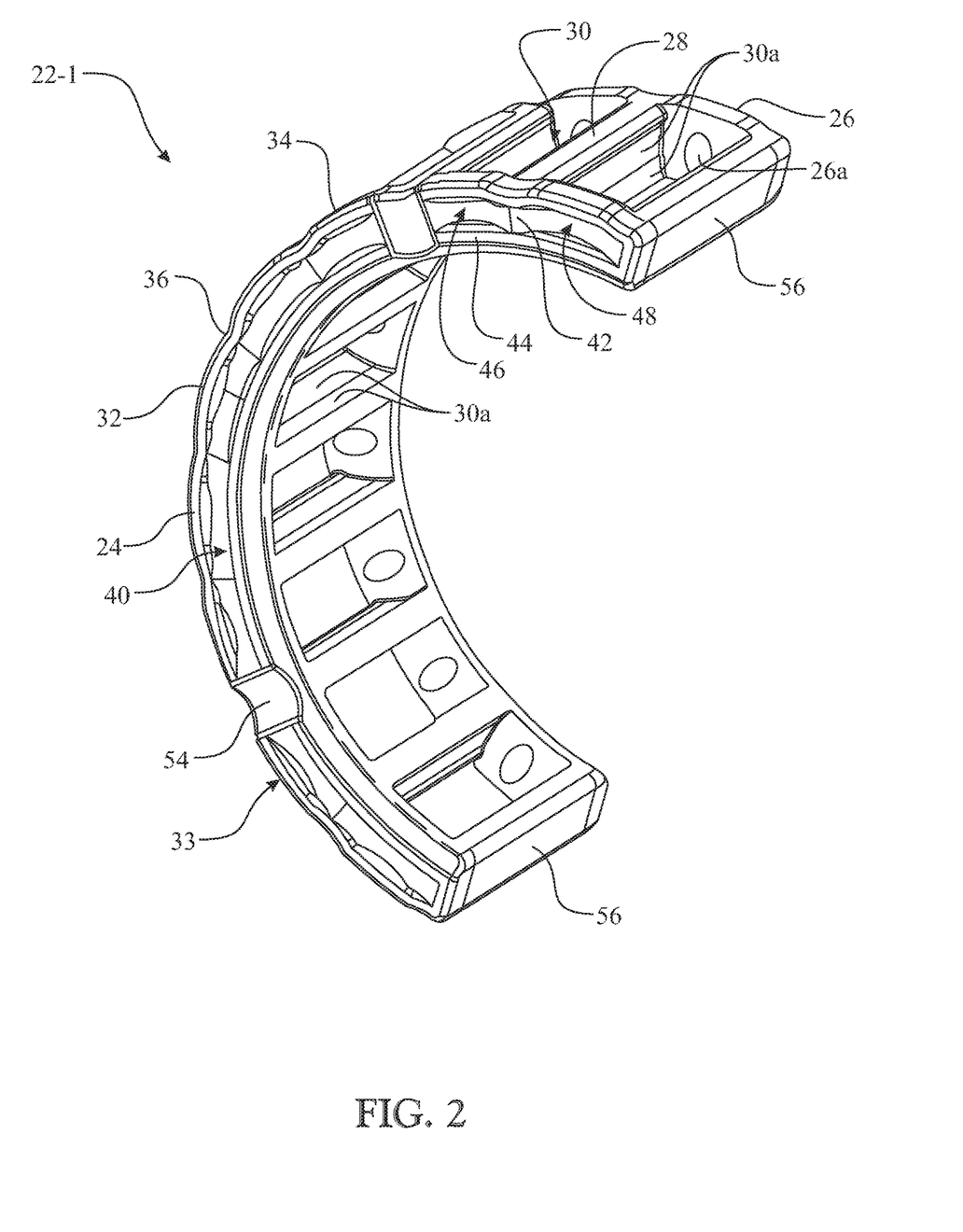
FIG. 2 presents a schematic perspective view of a bearing-cage half-shell of a bearing cage for a rolling-element bearing assembly depicted in FIG. 1.

For this purpose a cage shape presented in FIG. 2 is provided, wherein FIG. 2 shows a perspective depiction of a cage half-shell 22-1. Since usually in vehicles the crankshaft 8 is configured as a one-part component, the connecting rod 2 and the cage 22 must be configured multi-part, but at least two-part, for an assembly of the connecting rod/housing 2 and the connecting-rod- or main-bearing 1 and thus also for an assembly of the cage 22 on the crankpin 16 of the crankshaft 8. The cage half-shell 22-1 depicted in FIG. 2 is a half of such a split bearing cage 22 and comprises, exactly like its not-shown other bearing-cage half-shell, two side rings 24, 26, which are spaced from each other by bridges 28. As usual the bridges 28 form rolling-element receiving pockets 30, wherein the rolling elements 10 are guided spaced from one another. Each rolling-element receiving pockets 30 can include a tapering surface 30a of each bridge 28, wherein the tapering is in a radial direction, the tapering being disposed approximately centrally, wherein the rolling elements received in the associated cage pockets contact the bridge at their rolling-element ends. For an optimized axial contact surface of the rolling element 10 in the pocket 30 it can furthermore be provided that the pocket 10 has a recess 26a formed within at least one inner side wall of one of the side rings 24, 26 at the level of a center of the rolling-element 10.

In order to induce a lubricant movement in the rolling-element bearing 6 and to prevent static lubricant accumulations in an outer space 23 (see FIG. 1) and the rolling-element receiving pocket 30 of the cage 22, the side rings 24, 26 are configured corrugated or undulating as depicted in FIG. 2. Here on the one hand a corrugation 32 (or undulation) can be provided on a radially outer edge 33 of the bearing cage 22, which corrugation 32 comprises corrugation peaks 34 and corrugation valleys 36. Here the corrugation peaks 34 are preferably disposed in the region of the pockets 30, and the corrugation valleys 36 are disposed in the region of the bridges 28. A particularly good lubricant movement and lubricant guiding in the outer region 23, in particular radially outward, can thereby be achieved. As can furthermore be seen from FIG. 2, here the radially outermost point of the corrugation peak 34 is disposed approximately in the center of the pocket 30 so that lubricant can be directly guided onto the rolling element. Due to the rhythmically (periodically) tapered spaces the corrugation 32 itself ensures that lubricant that is located in the rolling-element receiving pocket 30 or in the outer region 23 of the rolling-element bearing 6 is guided to the rolling elements 10. Via a hydrodynamic effect the lubricant is thereby brought into a contact surface 50 (see FIG. 1) between the corrugation peak 34 and the race surface 12, and also brought out again, so that it also propagates toward rolling element 10. It Lubricant can thereby be prevented from statically lingering in the rolling-element receiving pocket 30 or in the outer region 23 of the side rings 24, 26 where it can no longer be supplied to the lubrication circuit.

Furthermore it is shown in FIG. 2 that alternatively or, as here, additionally, corrugations or undulations can also be formed on the axial side surfaces 40 of the side rings 24. Here in order to still form defined abutment surfaces for the bearing cage 22 on the crankshaft cheeks 18, 20, the corrugation 42 is concentrically received between two smooth annular surfaces 44, 46 that serve as abutment surfaces of the bearing cage 22 on the surrounding side cheeks 18, 20 of the crankshaft 8. This situation is in particular also to be seen in FIG. 1, wherein a section can be seen through a corrugation valley 48 of the corrugation 42. As depicted in the sectional view, the concentric annular partial regions 44, 46 are formed as abutment surfaces of the bearing cage 22 on the crankshaft cheeks 18, 20. At the same time it can clearly be seen in FIG. 1 that lubricant that is located in the radially outer region 50 or the axial outer region 52 would remain as a static volume in the bearing cages 22 if the corrugations were not present. However, both in region 50 and in region 52 the corrugations 32, 42 ensure that the lubricant is periodically compressed between the corrugation 32 and the raceway 12, or the corrugation 42 and the crankshaft cheeks 18, 20, and thus is removed from its static accumulation.

Figure 3:
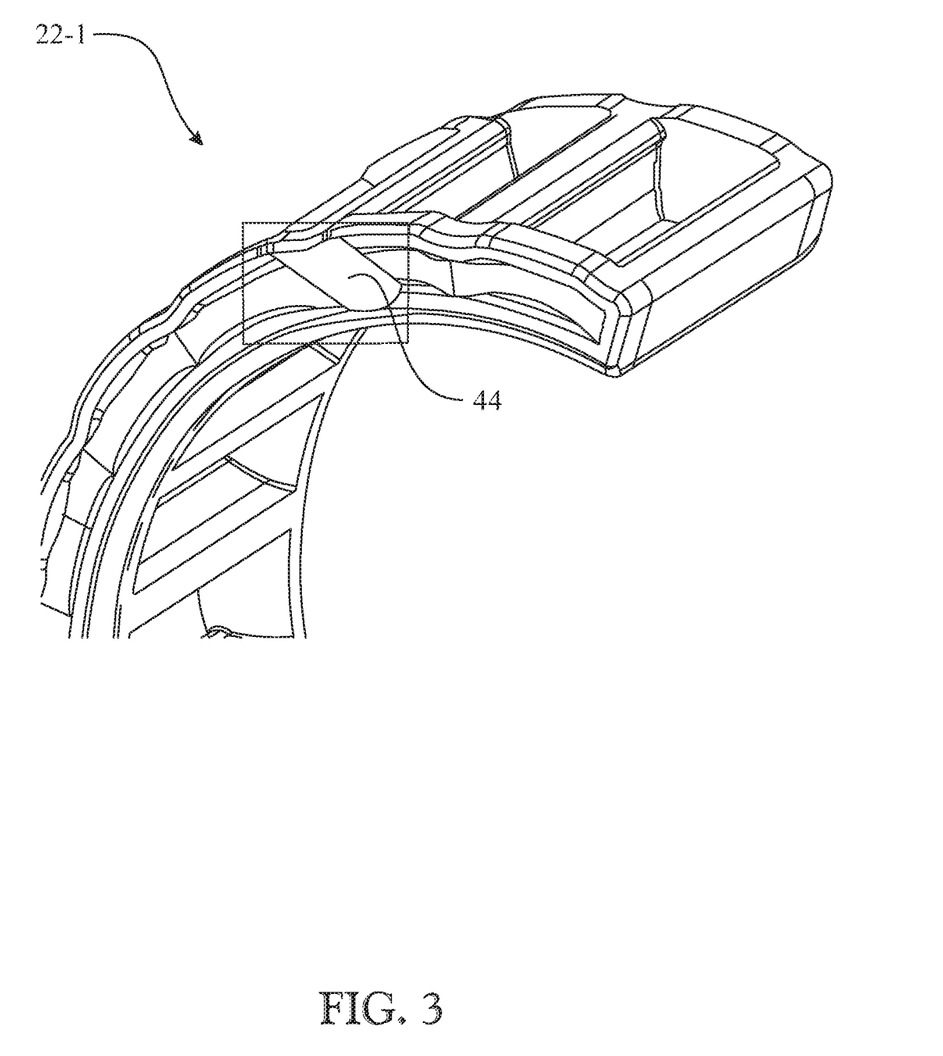
FIG. 3 presents a schematic perspective view of an alternatively designed bearing-cage half-shell.

FIG. 2 further shows that radially, or as depicted in FIG. 3, radially-tangentially oriented lubricant grooves 54 (an incline relative to a radial direction) can be provided that ensure a general inflow or outflow of lubricant to the rolling-element bearing 6. Here in particular the radially-tangentially oriented groove 54 of FIG. 3 can be oriented such that it is oriented corresponding to the direction of rotation in order to improve the inflow of lubricant into the bearing interior or the outflow from the bearing interior. Here it is again noted that the lubricant grooves specifically serve for an inflow and outflow of lubricant into/out of the rolling-element bearing 6, but due to their design cannot ensure a dynamic mixing and movement of the lubricant. For this purpose the corrugations 32, 42 are provided on the radial outer edge 33 or the side surfaces of the cage 22.

FIG. 2 furthermore shows contact surfaces 56 of the bearing-cage half-shell 22-1, with which the bearing-cage half-shell 22-1 abuts on the second bearing-cage half-shell (not depicted here). In order to provide a centric design and in order to be able to compensate manufacturing tolerances, in particular with a manufacturing of the cage from injection molding, it is provided to form the contact surfaces 56 of the cage segments connecting to each other complementary to each other, in particular concave-convex or convex-concave. The bearing-cage half-shells can thereby be easily centered and aligned with respect to each other. A slightly concave-concave formation on the bridge with slightly convex/elevated contact surfaces only via the side rings 24, 26 would also be possible.

Figure 4:
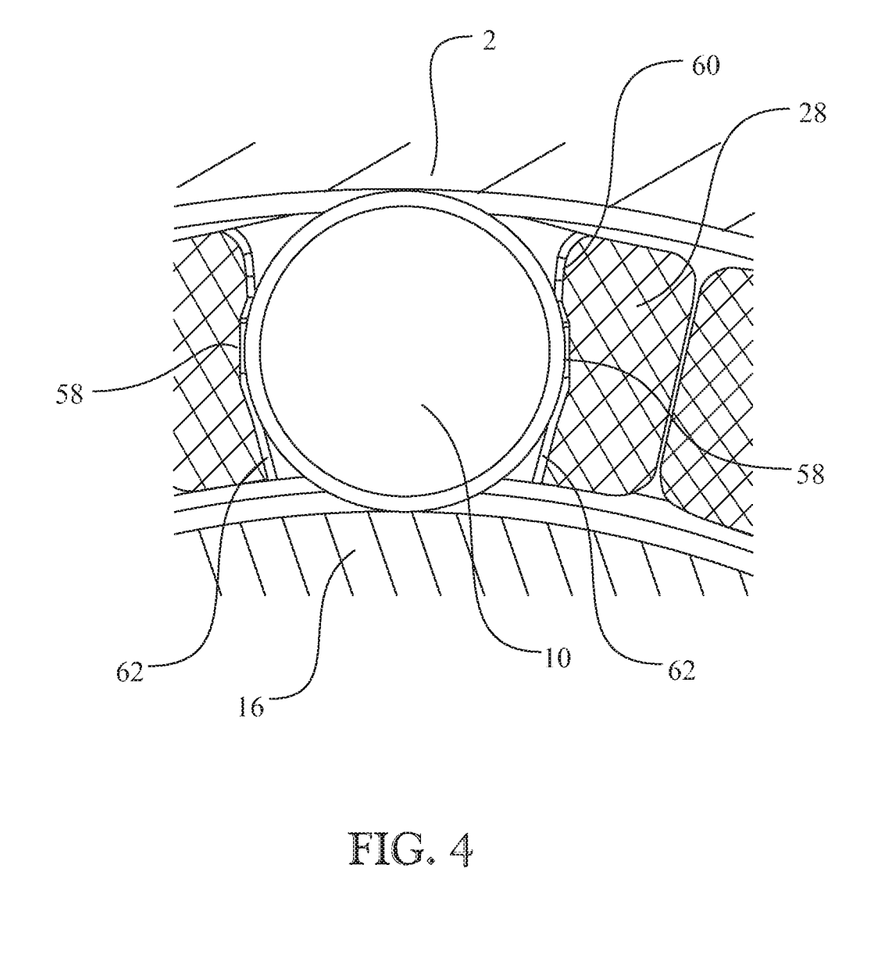
FIG. 4 presents a schematic sectional view through the bearing-cage half-shell depicted in FIG. 2 or FIG. 3.

FIG. 4 shows a further detail in a sectional view through the bearing cage 22 in the circumferential direction. From this sectional view the bridge shape of the bridges 28 can be seen, which bridge shape is essentially parallel in a contact region 58 of the rolling element 10 and extends along radially. In contrast, in bridge surfaces 60, 62 outside the contact surfaces 58 the bridge shape are adapted to the rolling elements 10 in an osculating manner in order to improve the lubricant guiding. Furthermore it can be seen in FIG. 4 that the osculation is configured as retaining lobes, with the result that the rolling elements 10 can be snapped-in into the bearing cage 22.

Advantageously the bearing cage 22 is formed as an injection-molded element, with the result that the corrugations 32, 42 can be formed easily. At the same time the corrugation shape of the bearing cage 22 supports the injection-molding method, since the corrugation shape influences the flow behavior of the injection-molding material.

Overall, using the presented bearing cage a crankshaft bearing assembly, or, generally, a rolling-element bearing in a confined installation space is provided wherein an improved lubricant guiding is possible. Due to the corrugation shape formed on the rolling-element bearing cage a static lubricant accumulation is in particular counteracted in regions between the rolling-element cage and surrounding components. Here the corrugation shape ensures on the one hand a general movement of the lubricant and on the other hand a forming of lubricant films in contact surfaces between bearing cage and surrounding components. The lubrication is thus better implemented and even critical points can thus easily be lubricated. Furthermore, the corrugation shape makes possible a simple forming of the bearing cage as an injected-molded element, since the corrugation shape positively influences the flow behavior of the injection-molded material. Here it is preferred in particular to locate injection points in regions of the bearing cage that are subjected to low mechanical loads. In order to compensate for manufacturing tolerances, in particular with injection molding, with the design of the injection-molded cage as cage segments the connection surfaces between the cage segments can be formed complementary to each other, with the result that a simple centering and fitting of the cage halves results. Here it is advantageous in particular when this complementary design arises, for example, in the region of a convex-concave end side. Due to the optimized lubricating and the forming of the bearing cage from plastic the efficiency of the motor can furthermore be improved, with the result that a lower fuel requirement and less exhaust are produced.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved bearing cages.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

Ref No. Description

1 Rolling-element bearing assembly
2 Connecting rod/housing
3 Connecting rod/housing side wall
4 Connecting rod eye/housing bore
6 Rolling-element bearing
8 Crankshaft
9 Crankshaft side wall
10 Rolling element
12 Outer race surface
14 Inner race surface
16 Crankpin
18, 20 Crankshaft cheeks
22 Bearing cage
23 Outer region
24, 26 Side rings
26*a* Recess
28 Bridges
30 Pockets
30*a* Bridge tapered pocket surface
32 Radial outer corrugation
34 Corrugation peak
36 Corrugation valley 40 Side surface
42 Lateral corrugation
44, 46 Annular smooth contact surfaces
48 Corrugation valley of the lateral corrugation
50, 52 Lubricant receiving space
54 Radial or radial-tangential lubricant grooves
56 Contact surfaces between cage half-shells
58 Contact surfaces between rolling element and bridge
60, 62 Bridge surfaces
S2 Connecting rod/housing side wall span
S6 Race surface side wall span
S8 Crankshaft side wall span

What is claimed is:

1. A rolling-element bearing assembly comprising:
a radially inner race surface;
a radially outer race surface;
a plurality of rolling elements disposed between the radially inner race surface and the radially outer race surface and received in a cage, the cage including a first side ring and a second side ring axially spaced from the first side ring by a plurality of bridges, adjacent bridges of the plurality of bridges forming pockets for receiving, spacing, and guiding the plurality of rolling elements; and
at least one corrugated surface formed on at least one of the first side ring and the second side ring, the corrugated surface comprising a series of corrugation peaks and a series of corrugation valleys provided in an alternating arrangement, the series of corrugation peaks and the series of corrugation valleys being arranged such that each corrugation valley of the series of corrugation valleys is disposed axially adjacent to a region of a rolling-element center and each corrugation peak of the series of corrugation peaks is disposed axially adjacent to a bridge, wherein each corrugation peak of the series of corrugation peaks rises axially outwardly from a respective corrugation valley of the series of corrugation valleys,
wherein the radially inner race surface is disposed on a first component and the radially outer race surface is disposed on a second component,
wherein the first component and the second component are rotatably supported with respect to each other,
wherein the rolling-element bearing assembly is bordered axially by at least one of a side wall of the first component and a side wall of the second component, wherein the at least one of the first component side wall and the second component side wall extends at least partially radially beyond the corresponding race surface.

2. The rolling-element bearing assembly according to claim 1, further comprising a second series of corrugation peaks and a second series of corrugation valleys provided in an alternating arrangement each corrugation peak of the second series of corrugation peaks rises substantially radially outward from the respective corrugation valley of the second series of corrugation valleys.

3. The rolling-element bearing assembly according to claim 2, wherein each corrugation peak of the second series of corrugation peaks is disposed axially adjacent a pocket and each corrugation valley of the second series of corrugation valleys is disposed axially adjacent a bridge.

4. The rolling-element bearing assembly according to claim 1, wherein the at least one corrugated surface is formed on a lateral surface of the first side ring radially between a first radially planar annular region and a second radially planar annular region.

5. The rolling-element bearing assembly according to claim 4,
the cage further comprising at least one first cage segment and one second cage segment, wherein the at least one first cage segment and one second cage segment abut on each other at separating surfaces, wherein the separating surfaces are complementary to each other,
at least one of the side rings further comprising at least one lubricant groove that extends at least one of radially or inclined relative to a radial direction,
wherein the bearing cage is manufactured from an injection-moldable material using an injection-molding method,
wherein at least one bridge of the cage has a tapering in a radial direction, the tapering being oriented in a direction inward from the associated cage pocket as the tapering extends from a peripheral edge of the associated bridge towards the rolling element center, wherein the rolling elements received in the associated cage pockets contact the bridge at their rolling-element ends,
wherein in at least one pocket of the pockets, the cage contact surfaces extending between the rolling element and the bridge are configured as radially extending, parallel contact surfaces, wherein bridge surfaces outside the contact surfaces are formed as retaining lobes wherein the retaining lobes cause the rolling element to osculate during use, and
each pocket includes a recess formed within an inner side wall of at least one of the first side ring and the second side ring at the level of the rolling-element center.

6. The rolling-element bearing assembly according to claim 1, wherein
the bearing cage is manufactured from an injection-moldable material using an injection-molding method.

7. The rolling-element bearing assembly according to claim 1, wherein the cage includes at least one first cage segment and at least one second cage segment, the at least one first cage segment and at least one second cage segment abut on each other at separating surfaces, wherein the separating surfaces are complementary to each other.

8. The rolling-element bearing assembly according to claim 1, wherein at least one of the first side ring and the second side ring includes at least one lubricant groove that extends at least one of radially or inclined relative to a radial direction.

9. The rolling-element bearing assembly according to claim 1, wherein at least one bridge of the cage has a tapering in a radial direction, the tapering being oriented in a direction inward from the associated cage pocket as the tapering extends from a peripheral edge of the associated bridge towards the rolling element center, wherein the rolling elements received in the associated cage pockets contact the bridge at their rolling-element ends.

10. The rolling-element bearing assembly according to claim 1, wherein in at least one pocket of the cage contact surfaces between rolling element and the bridge are configured as radially extending, parallel contact surfaces, wherein bridge surfaces outside the contact surfaces are formed as retaining lobes wherein the retaining lobes cause the rolling element to osculate during use.

11. The rolling-element bearing assembly according to claim 1, wherein each pocket includes a recess formed within an inner side wall of at least one of the first side ring and the second side ring at the level of the rolling-element center.

12. The rolling-element bearing assembly according to claim 1, wherein the at least one corrugated surface is formed on an axially outwardly facing surface of the cage.

13. The rolling-element bearing assembly according to claim 12, wherein the at least one corrugated surface is located radially between a first radially planar annular surface and a second radially planar annular surface.

14. The rolling-element bearing assembly according to claim 13, further comprising a lubricant groove extending from the first annular surface across the at least one corrugated surface and into the second annular surface.

15. A cage for a rolling-element bearing assembly, comprising a first side ring and a second side ring axially spaced from the first side ring by a plurality of bridges, adjacent bridges of the plurality of bridges forming pockets for receiving, spacing, and guiding a plurality of rolling elements; and at least one corrugated surface formed on at least one of the first side ring and the second side ring, the corrugated surface comprising a series of corrugation peaks and a series of corrugation valleys provided in an alternating arrangement, the series of corrugation peaks and the series of corrugation valleys being arranged such that each corrugation valley of the series of corrugation valleys is disposed axially adjacent to a region of a rolling-element center and each corrugation peak of the series of corrugation peaks is disposed axially adjacent to a bridge, wherein each corrugation peak of the series of corrugation peaks rises axially outwardly from a respective corrugation valley of the series of corrugation valleys.

16. A bearing comprising a cage according to claim 15, the bearing further comprising:
an outer bearing ring;
an inner bearing ring;
a plurality of rolling elements in the cage,
wherein the cage is located between the outer bearing ring and the inner bearing ring forming a rolling element bearing assembly,
wherein the cage is located in a groove in a surface of one of the outer bearing ring and the inner bearing ring.

17. A cage for a rolling-element bearing assembly, comprising a first side ring and a second side ring axially spaced from the first side ring by a plurality of bridges, the bridges defining pockets for receiving, spacing, and guiding a plurality of rolling elements; and at least one corrugated surface formed on at least one of the first side ring and the second side ring, the corrugated surface comprising a series of corrugation peaks and a series of corrugation valleys provided in an alternating arrangement,
wherein the at least one corrugated surface is an axially outwardly facing surface of the cage,
wherein at least one of the first side ring of the cage and the second side ring of the cage includes an axially outwardly facing corrugated surface,
wherein the axially outwardly facing corrugated surface is located radially between a first smooth annular surface and a second smooth annular surface.

* * * * *